T. S. DISSTON.
POST-HOLE DIGGER.
No. 191,320.
Patented May 29, 1877.
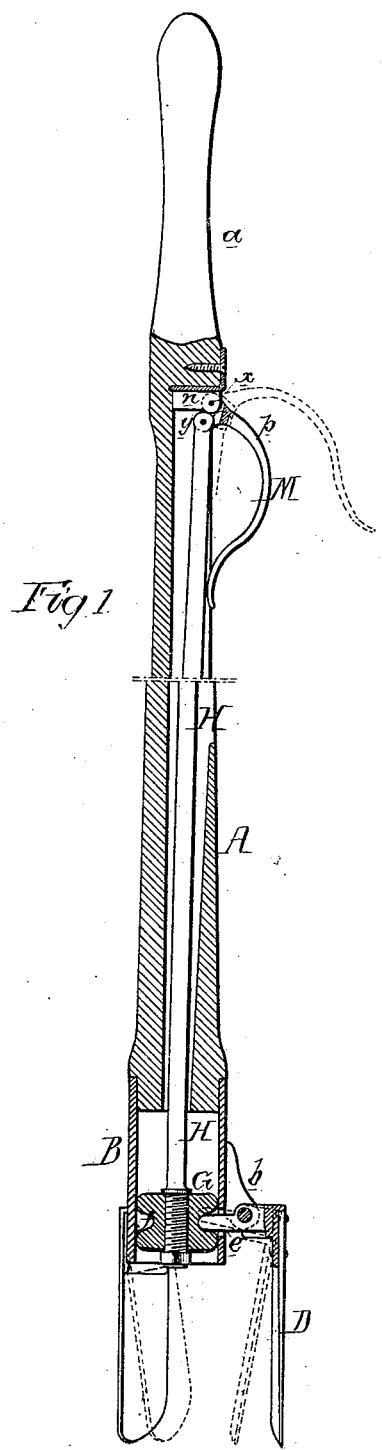
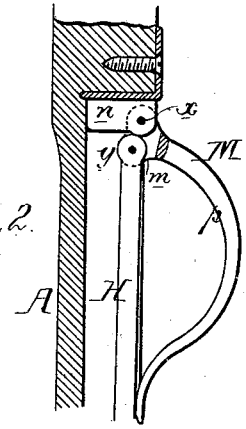
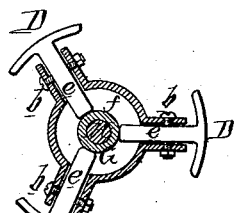
Witnesses
John M. Deemer
Harry Smith
Inventor
Thomas S. Disston
by his Attorneys
Howson and Son

UNITED STATES PATENT OFFICE.

THOMAS S. DISSTON, OF PHILADELPHIA, PENNSYLVANIA, ASSIGNOR TO HENRY DISSTON & SONS, OF SAME PLACE.

IMPROVEMENT IN POST-HOLE DIGGERS.

Specification forming part of Letters Patent No. 191,320, dated May 29, 1877; application filed March 16, 1877.

*To all whom it may concern:*

Be it known that I, THOMAS S. DISSTON, of Philadelphia, Pennsylvania, have invented a new and useful Improvement in Post-Hole Diggers, of which the following is a specification:

My invention relates to an improvement in diggers provided with hinged blades to be thrust into the ground and to withdraw the earth therefrom; and the objects of my invention are, first, to so construct an implement of this class that it will have but a single stem or handle and blades capable of being opened or closed independently of said stem or handle; and, second, to so combine the digging-blades with an operating-lever that the latter will serve to lock the said blades when they are thrust into the ground.

In the accompanying drawing, Figure 1 is a vertical section of my improved post-hole digger; Fig. 2, an enlarged sectional view of the upper portion of the same, and Fig. 3 a transverse section.

The tubular stem A of the digger has at its upper end a suitable handle, $a$, and to its lower end is secured the tubular socket B, from which radiate, in the present instance, three pairs of lugs, $b$, and to each pair of lugs is hinged a lever, one arm of which consists of the digging-blade D, the other or short arm $e$ projecting through a slot in the socket B, being adapted at one end to a groove, $f$, in a collar, G, which is secured to the operating-rod H, and is arranged to slide in, and to be guided by, the socket B.

The upper end of the rod H is hinged, by a pin, $y$, to the short arm $m$ of a lever, M, which is hung to a lug, $n$, at the upper end of the tubular stem A.

When the digging-blades are in the position shown by plain lines in Figs. 1 and 3, they may be thrust into the ground, in doing which they will retain their vertical position, all tendency of the blades to move inward as they are pushed into the ground being prevented by the lever M, for the fulcrum $x$ of the latter and the pin $y$ are so arranged in respect to each other and to the long arm $p$ of the lever that any tendency of the digging-blades to move inward and to raise the rod H only serves to press the said long arm of the lever against the said rod.

In other words, the lever M serves to lock the digging-blades while they are thrust into the ground, after which, by raising the long arm of the lever M, the blades may be moved inward, as shown by dotted lines, Fig. 1, thereby embracing the earth within their limits, and the blades with the earth may then be raised from the ground.

It will be evident that by employing but a single stem or handle, A, as shown and described, the blades D may be driven into the ground more forcibly and directly than when double or split handles are used, while the use of a single stem in connection with an independent rod or rods for opening and closing the blades enables me to employ three or more of said blades when desired, instead of limiting myself to two, as in the usual diggers, in which two arms, each carrying a blade, are used.

I do not, however, wish to confine myself to the use of three or more blades, as my invention is equally applicable to two-bladed diggers; neither is it essential that but one operating-rod centrally located should be employed, as the number and position of the said rods may be varied, as circumstances may suggest.

I claim as my invention—

1. The combination, in a post-hole digger, of the hinged digging-blades D with the lever M and devices, substantially as described, whereby the said lever can be used to both move the blades inward and lock the blades when the latter are open, as set forth.

2. The combination of the blades D and their arms $e$ with the rod H and grooved collar G, as described.

In testimony whereof I have signed my name to this specification in the presence of two subscribing witnesses.

THOS. S. DISSTON.

Witnesses:
HERMANN MOESSNER,
HARRY SMITH.